United States Patent
Kokkonen et al.

(10) Patent No.: US 7,774,010 B2
(45) Date of Patent: Aug. 10, 2010

(54) PEER-TO-PEER GROUP MANAGEMENT FRAMEWORK AND METHODOLOGY

(75) Inventors: Esko Kokkonen, Espoo (FI); Olli Rantapuska, Vantaa (FI)

(73) Assignee: Nokia Corporation, Espoo (FI)

( * ) Notice: Subject to any disclaimer, the term of this patent is extended or adjusted under 35 U.S.C. 154(b) by 1008 days.

(21) Appl. No.: 11/476,920

(22) Filed: Jun. 28, 2006

(65) Prior Publication Data

US 2007/0021137 A1    Jan. 25, 2007

Related U.S. Application Data

(60) Provisional application No. 60/696,914, filed on Jul. 6, 2005.

(51) Int. Cl.
*H04B 7/00*    (2006.01)
(52) U.S. Cl. .................... 455/518; 455/519; 455/3.05; 455/3.04; 455/90.2; 455/415; 455/416; 370/260; 709/204
(58) Field of Classification Search .............. 455/518, 455/519, 3.05, 3.04, 90.2, 415, 416, 417, 455/418, 422.1; 370/260, 261, 262, 432, 370/352; 709/204, 220
See application file for complete search history.

(56) References Cited

U.S. PATENT DOCUMENTS 7,360,156 B1 * 4/2008 Braun et al. ................. 715/255
2003/0055892 A1 * 3/2003 Huitema et al. ............. 709/204
2003/0056093 A1 * 3/2003 Huitema et al. ............. 713/156
2004/0082352 A1 * 4/2004 Keating et al. ............. 455/519
2004/0128013 A1 * 7/2004 Blawat et al. ............... 700/100

FOREIGN PATENT DOCUMENTS

EP    1 427 149    6/2004
WO   WO 02069568  9/2002

OTHER PUBLICATIONS

Korean Office Action for corresponding KR Application No. 10-2008-7003012, Oct. 27, 2009, Korea.

* cited by examiner

*Primary Examiner*—Matthew D Anderson
*Assistant Examiner*—Shaima Q Aminzay
(74) *Attorney, Agent, or Firm*—Ditthavong Mori & Steiner, P.C.

(57) ABSTRACT

A group management framework and methodology for managing symmetric groups using peer-to-peer network communications. Group management is distributed throughout the group members of the peer-to-peer network, and group information is mirrored in each of the members of the group. The framework facilitates management of group member lists, provides group communication capabilities for external applications, and security for the group communication without the need for intermediary servers to provide services.

29 Claims, 8 Drawing Sheets

PEER-TO-PEER GROUP MANAGEMENT FRAMEWORK AND METHODOLOGY

RELATED APPLICATIONS

This application claims the benefit of Provisional U.S. patent application Ser. No. 60/696,914, filed on Jul. 6, 2005, to which priority is claimed pursuant to 35 U.S.C. §119(e) and which is hereby incorporated herein by reference.

FIELD OF THE INVENTION

This invention relates in general to communicating information among communication devices, and more particularly to a system, apparatus and method for managing symmetric groups through peer-to-peer communication and mirroring of group data.

BACKGROUND OF THE INVENTION

Community or "group" services are becoming increasingly popular on the Internet. Group communications generally refers to communications between an arranged or otherwise affiliated group of users. Blogs, content sharing sites, and message posting sites represent different types of group communications. Group communications allow users to form loosely-connected communities around a subject area, hobby club, social group, etc.

Network users, whether they use a mobile device or a PC to communicate, do not have an easy way to exchange information inside a group of people. Group communication is usually limited to sending group e-mail or initiating a group chat if everyone is online. It can be quite difficult to share files with a defined group of people, or to send application information such as calendar entries for the users to see. Web-based community services may offer features for the group members to use, but the service provider controls the services and the users cannot add new, custom features. They also have their own username and password schemes that each member has to apply for.

Some forms of electronic communication are inefficient or cumbersome when used for group communication. For example, e-mail is the most popular way of communicating within a group today. People can send pictures or other content to their group of friends via e-mail, as well as calendar entries, and other files. However, e-mail is lacking in several areas for purposes of group communication. For example, it is not suitable for sending large amounts of data, and each message has to be handled manually. E-mail can be forged and is therefore insecure by nature. There is also a risk associated with opening e-mail attachments.

Further, in current systems, group services rely on server-based implementations where the service provider has all group members' information in its possession. Users can join such groups as long as they agree with the service terms of the service provider or third party who administers the group services. In any case, the users have to agree with the terms. Thus, in such prior art systems, these administered services are restricted in some way, and users must agree with the service providers' terms and conditions. Further, the service provider may in fact own rights to the members' data, and may choose to stop the service at any time whereby the group information is lost. The group has little or no means of controlling the lifetime of the service, and has to rely on and trust the service provider with their information. Additionally, hosting group services via a particular device of the group, such as a mobile phone, would lead to various problems. For example, due to the nature of mobile phones, they may not be available from time to time—the phone may be out of a coverage area, may have expended its battery life, etc. In such situations, the service would be unavailable to the entire group.

Accordingly, there is a need in the communications industry for a better manner of managing of group communications. The present invention fulfills these and other needs, and offers other advantages over the prior art approaches.

SUMMARY OF THE INVENTION

To overcome limitations in the prior art described above, and to overcome other limitations that will become apparent upon reading and understanding the present specification, the present invention discloses a system, apparatus and method for managing symmetric groups using peer-to-peer communications.

In accordance with one embodiment of the invention, a method is provided for facilitating server-less management of group communications among a plurality of members of a group. At least one group management function is initiated by an initiating member of the group. Via peer-to-peer communication, at least one group management message associated with the group management function is transmitted from the initiating member to one or more other members and/or prospective members of the group.

According to another embodiment of the invention, a method is provided for facilitating management of group communications among a plurality of members of a group. An invitation is transmitted via a peer-to-peer connection from a communication device of an inviting member of the group to a communication device of a prospective member of the group. Upon acceptance of the invitation by the prospective member, a member list is updated at the communication device of the inviting member to include the prospective member as a new member of the group. Group data, including the member list, is transmitted via peer-to-peer connections from the inviting member to the new member.

In accordance with another embodiment of the invention, a method is provided for facilitating management of group communications among a plurality of members of a group. Transmission of application data is initiated from a communication device of a first member of the group. Addresses of each of the other members of the group are identified based on a member list locally stored at each of the communication devices of the members of the group. The application data is transmitted via peer-to-peer connections from the first member to the other members of the group.

In accordance with another embodiment of the invention, a group management module associated with a communication device is provided, for facilitating management of peer-to-peer communications among members of a group. The group management module includes a local database to store group data including a member list for each of the groups to which the communication device is affiliated. A member management module is coupled to the local database to manage storage and retrieval of the group data, and an application programming interface (API) is configured to interface at least application content and a user interface (UI) with the member management module. A communication module is coupled to the member management module to effect peer-to-peer communications between the communication device and the communication devices of other members of the group.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described representative examples of systems, apparatuses, and methods in accordance with the invention.

BRIEF DESCRIPTION OF THE DRAWINGS

The invention is described in connection with the embodiments illustrated in the following diagrams.

DETAILED DESCRIPTION OF EMBODIMENTS OF THE INVENTION

In the following description of various exemplary embodiments, reference is made to the accompanying drawings which form a part hereof, and in which is shown by way of illustration various embodiments in which the invention may be practiced. It is to be understood that other embodiments may be utilized, as structural and operational changes may be made without departing from the scope of the present invention.

Generally the present invention provides, among other things, a peer-to-peer framework for managing symmetric groups. For example, group management messages may be transmitted directly to group members using peer-to-peer network connections. The framework can be used to, for example, manage group member lists, provide group communication capabilities for external applications, provide security for group communication, and other group management functions without the need for server control. The present invention further allows groups to evolve without constraints of service providers and enable peer-to-peer storage of group data on group member devices. Group information is stored by each involved member, providing fault-tolerance without the need for external administration, thereby providing a robust peer-to-peer communication solution.

As indicated above, one aspect of the invention involves a peer-to-peer framework and methodology for managing group communications. A group management framework in accordance with the present invention may be implemented in a peer-to-peer fashion, i.e., a server-less framework. In server-based communications, communication device users (e.g., "peers" in a peer-to-peer network configuration) are very limited in their ability to modify, add, or otherwise manage group features, as the service provider controls such features and also typically requires users to be associated with independent usernames, passwords, etc. Server-based communications such as e-mail are also not suitable for large amounts of data, and exhibit other shortfalls such as the need to manually handle each message, e-mail forgery, risk of viruses when opening attachments, and the like. It is also noted that the messages themselves may be filtered or otherwise monitored in server-based communications. For these and other reasons, the peer-to-peer group management framework and methodology of the present invention is particularly advantageous and provides a new paradigm in electronic group communications.

Figure 1:
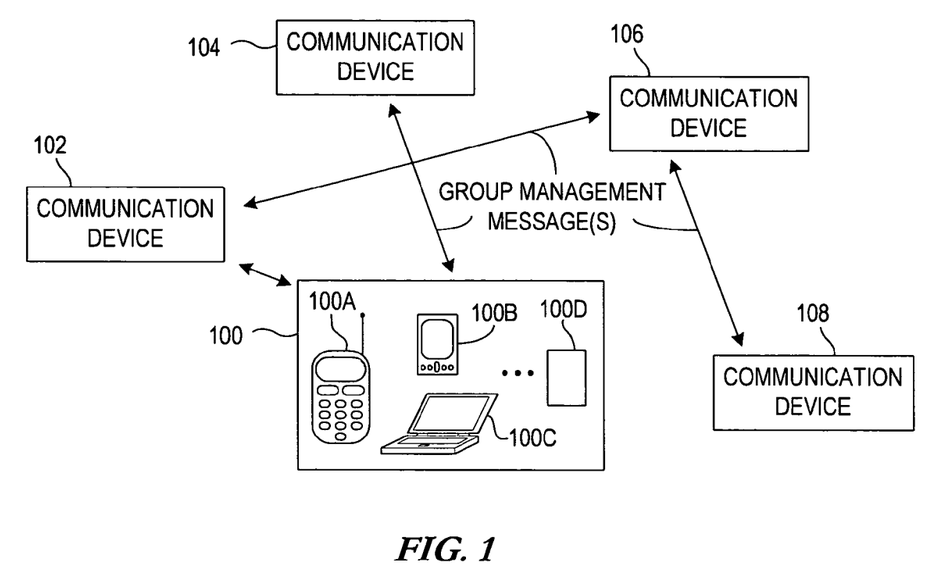
FIG. 1 is a block diagram generally illustrating the group management methodology in accordance with the present invention.

FIG. 1 is a block diagram generally illustrating the group management methodology in accordance with the present invention. The group of communication devices 100-108 represents a peer-to-peer network. As shown by communication device 100, any of the devices 100-108 (or other number of devices) may include wireline or wireless devices such as a mobile phone 100A, Personal Digital Assistant (PDA) 100B, computer 100C, or other device 100D capable of participating in peer-to-peer network communications.

As will be described in greater detail below, a plurality of the devices send/receive group management messages which provide the requisite information to establish and manage communications and content sharing among members of the group. For example, new group member invitations, white listing of known members and/or black listing of non-members, application functions, and the like can be handled through group management messages between the members. In this manner, many advantages over the prior art can be realized, including but not limited to instant notification of new data (e.g., push communication), the possibility to integrate with external applications with group communication, automatic dispatching/handling of different types of data, white listing which provides security, etc. This therefore provides, among other things, server-less group definition and dynamic updating of such definition as members join or leave the group.

Figure 2:
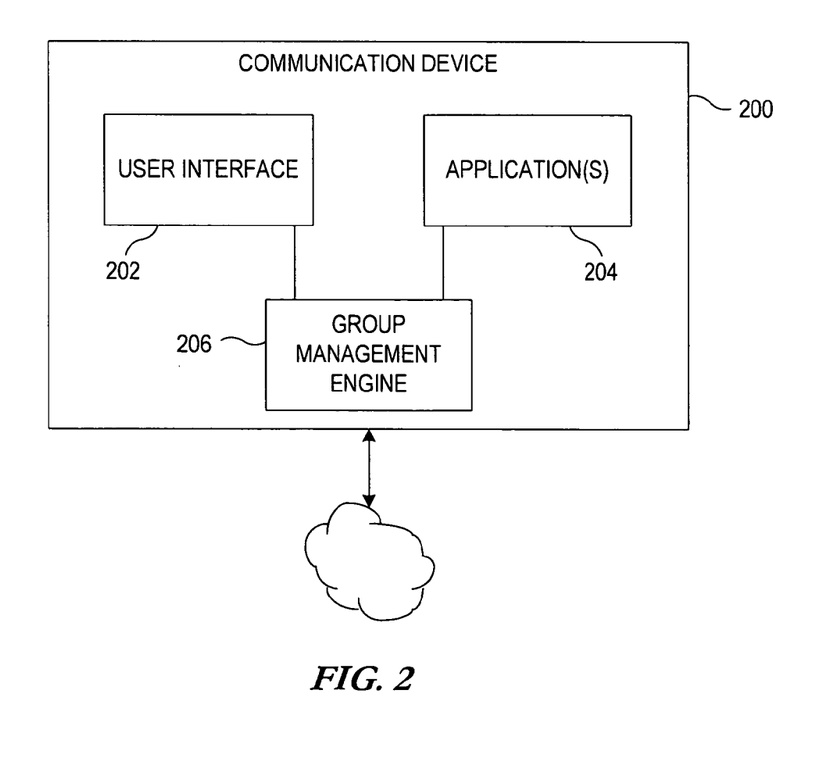
FIG. 2 is a block diagram illustrating one embodiment of a communication device that implements a group management framework in accordance with the present invention.

FIG. 2 is a block diagram illustrating one embodiment of a communication device 200 that implements a group management framework in accordance with the present invention. In the embodiment of FIG. 2, a peer-to-peer group management framework is contemplated that does not utilize a server(s). Group management messages may be transmitted directly to/from a device 200 associated with a group member using peer-to-peer network connections. A user interface (UI) component 202 is provided to allow the user to interface with the device 200, and thereby guide the communications with other group members or prospective members. The applications 204 can be used to exchange information through the framework. The group management engine 206 performs or otherwise facilitates functions such as forming connections between the group members, transmitting the group management messages and/or data, maintaining and/or otherwise assisting in the maintenance of group information (e.g., club list, member list, member management functionality, etc.).

Figure 3:
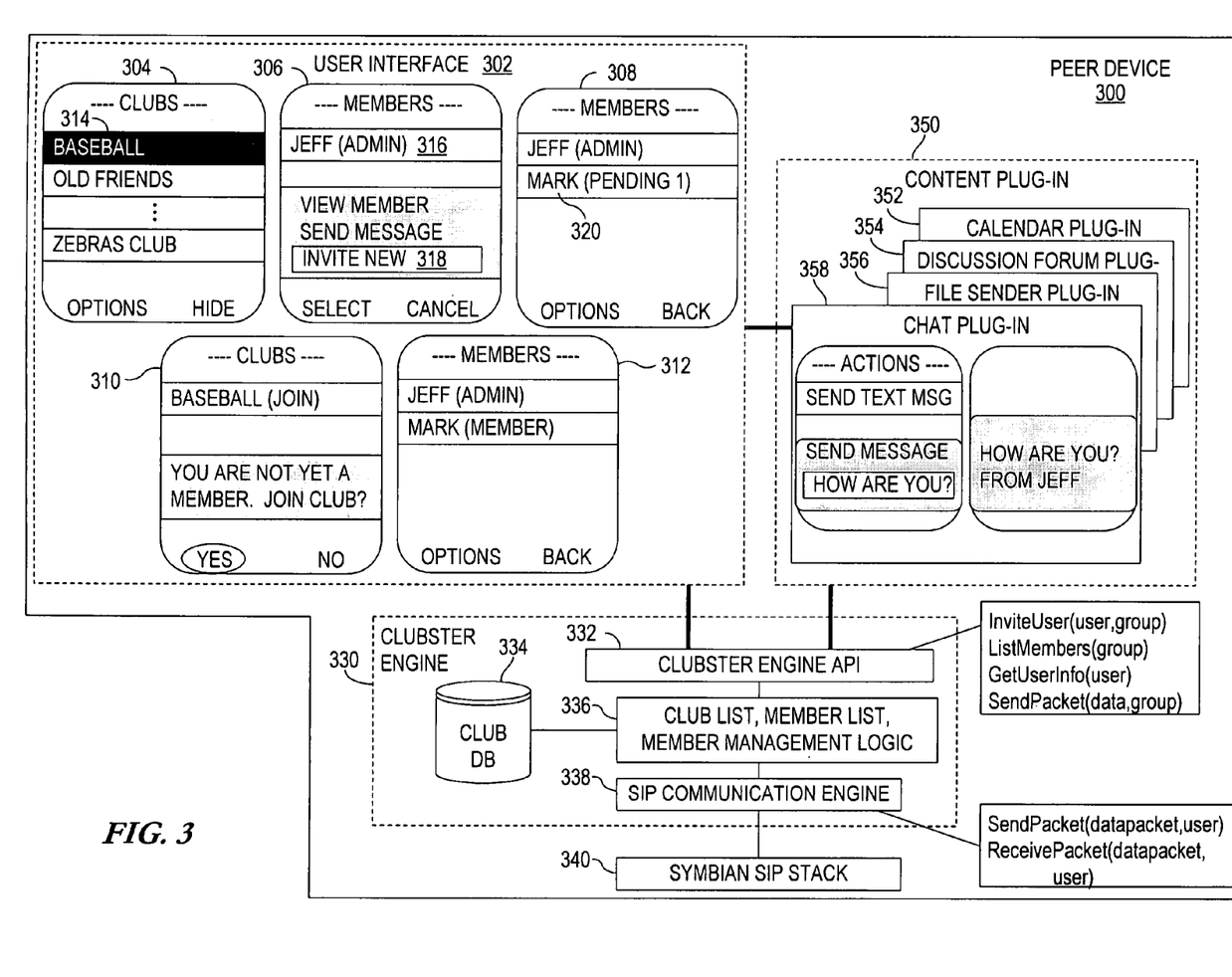
FIG. 3 illustrates a representative embodiment of a group management framework according to the present invention.

A more particular, representative embodiment of the group management framework is illustrated in FIG. 3. In this embodiment, the peer device 300 includes a UI 302, which may include images such as a Graphical User Interface (GUI) or other interface to present information to users, accept user commands, and/or other UI functions. In the illustrated embodiment, user interface screens 304-312 illustrate representative screens for peer devices used to invite a member to a group. For example, for a baseball club 314, a member (e.g., Jeff 316) may invite 318 a new member, Mark 320. The new member may be invited to join the club, as shown at screen 310. If the new member accepts, the new member (Mark) is accepted as a new member as shown at screen 312.

To perform such a invitation or other group management function, a group management framework architecture 330 is provided, which is labeled the "Clubster engine" in the illustrated embodiment. In the illustrated embodiment, the Clubster engine 330 includes an engine Application Programming Interface (API) 332, a club database 334 and associated member management logic 336 for managing information such as the club list and member list, and a communication engine 338. The communication engine 338 of the illustrated embodiment uses the Session Initiation Protocol (SIP) to form connections between the group members and to transmit data as needed. The SIP communication engine 338 may sit on top of a SIP stack, such as a Symbian SIP stack 340 in the case of a Symbian operating system. The SIP (or other similar) communication engine 338 facilitates sending of messages such as, for example, SendPacket(datapacket,user), ReceivePacket(datapacket,user), and/or other similar messages.

The engine API 332 interfaces with the user interface 302 and applications, such as depicted by the content plug-in module 350. The API 332 facilitates communication of messages such as, for example, a prospective member invitation [e.g., InviteUser(user,group)], member lists [e.g., ListMembers(group)], obtaining user information [e.g., GetUserInfo (user)], packet distribution [e.g., SendPacket(data,group)], etc. In the illustrated embodiment, applications are implemented as plug-in components, such as the calendar plug-in 352, discussion forum plug-in 354, file sender plug-in 356, chat plug-in 358, and the like.

One use example involves inviting members to the group (also referred to as "club"). In such an example, when a person is invited to a group, he/she gets the invitation directly from one of the group members. The invitation acceptance is transmitted back to the inviting member, who will then handle mirroring the group data and announcing the new member to other members. The illustrated embodiment uses SIP to form connections between the group members and to transmit data as needed. The Clubster engine 330 component includes the group management framework implementation of the present invention, and allows users to invite other users to clubs using the UI component 302, and also use other applications 350 to exchange information through the framework.

Other group management features such as leaving groups can be implemented in a similar manner; e.g., a person wishing to leave a club uses his/her group management application to resign from the group, which sends a resignation message to each member of the group. The members' framework instances then remove the resigning person from their member lists automatically.

The links to external applications are, in one embodiment, designed to be implemented as plug-in components. For example, the calendar plug-in 352 can be used to send calendar entries to club members. Thus, external applications 350 can make use of the established clubs by using a plug-in(s) to communicate through the Clubster engine 332. In one embodiment, when a plug-in sends data to a club, the data is tagged with an identification of that plug-in. Using that tag, the receiving instance of the framework can dispatch the data to the correct plug-in, and the plug-in can deliver it to the application as will be described in greater detail below.

Representative use examples will now be described in connection with FIGS. 4-8. It should be recognized that the examples of FIGS. 4-8 are provided for purposes of facilitating an understanding of representative functions associated with the group management framework of the present invention, and the invention is clearly not limited to the particular examples set forth herein.

Figure 4:
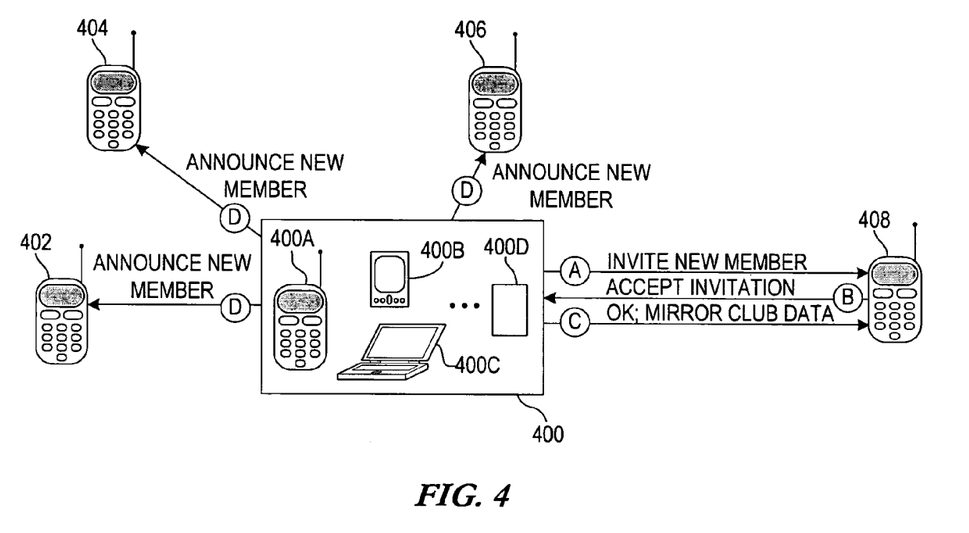
FIG. 4 illustrates a representative use case for inviting a new user(s) to a group.

Referring first to FIG. 4, a representative use case for inviting a new user to a group is illustrated. In the illustrated embodiment, the peer-to-peer framework provides for the management of symmetric groups, where a symmetric group refers to a group where the group member list is shared within the group. When the symmetric group management functionality is separated from the actual group services as in the illustrated embodiment, the management functions are specified in a generic module that can be applied to all kinds of groups. Using that module, it is possible to create new groups, invite people to join them, leave groups, force a specified member(s) to leave the group, and other group management actions. FIG. 4 represents a symmetric group management function for inviting a user to a group.

As shown in FIG. 4, a plurality of devices associated with users may form a group. For example, the devices 400, 402, 404 and 406 represent a group capable of performing peer-to-peer communications. Any of the devices 400, 402, 404, 406 represent any communication device capable of performing peer-to-peer connections, including a mobile phone 400A, PDA 400B, computer 400C, or other wireline or wireless device 400D capable of participating in peer-to-peer network communications. When a new person is invited to a symmetric group, the invitation is sent from a group member, and if the invitee accepts, group information is transferred to the invitee and other group members are notified about the inclusion of the new member in the group. More particularly, one of the group members sends an invite "A" via his/her communication device 400 to the communication device 408 of the user to be invited to the group. The device 408 user may respond with an acceptance of the invitation "B". The inviting user then mirrors the club information "C"; i.e., the club information is propagated to the new member. This club information may include various information regarding the club, including the member list. Further, the new member is announced "D" to other members 402, 404, 406 of the group. The inviting device 400 of the illustrated embodiment therefore accepts the responsibility of providing the club data to the invitee device 408, and also the responsibility of notifying existing members. Because the new member 408 now has the club data, it too can invite new members in an analogous fashion.

Figure 5:
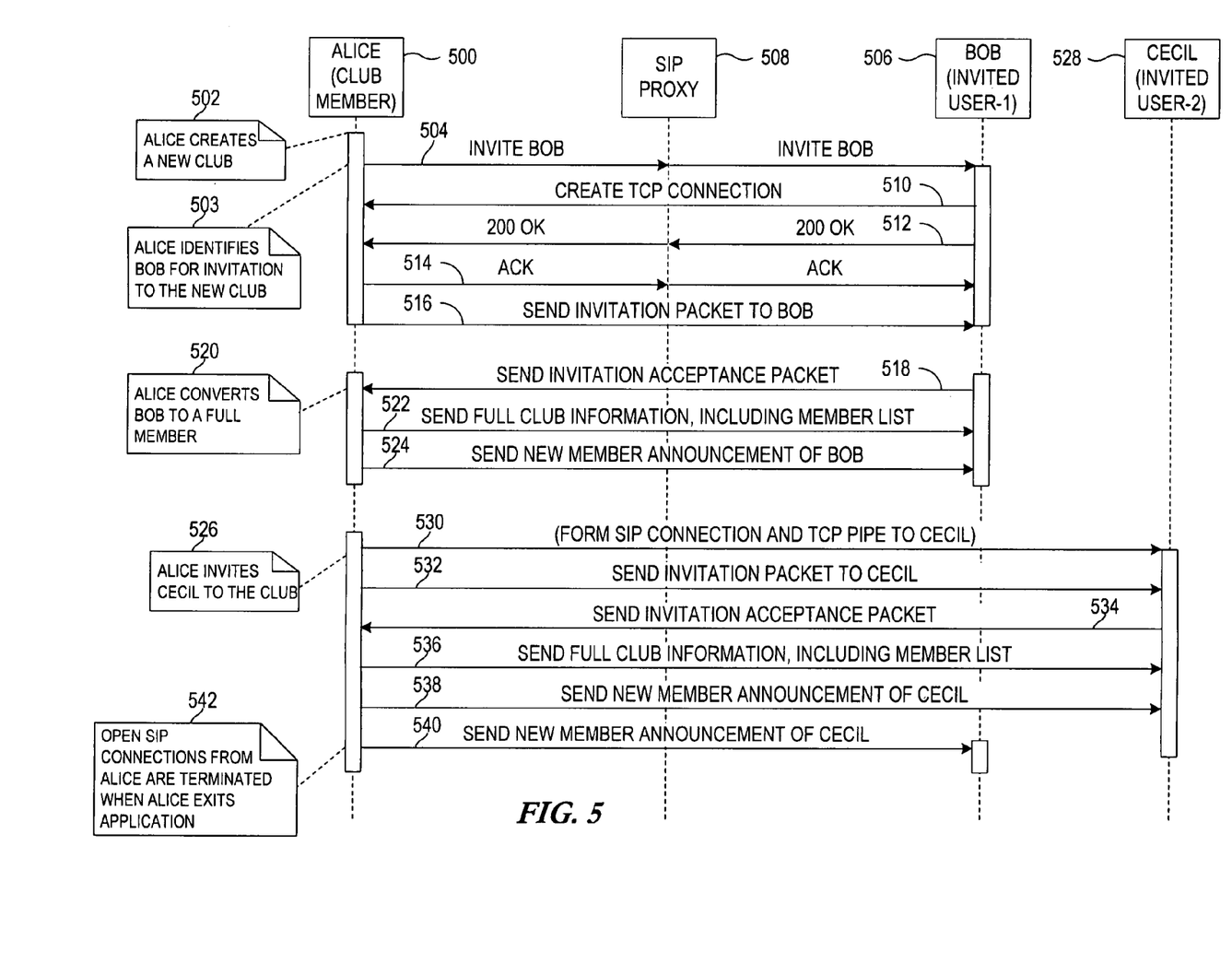
FIG. 5 is a message flow diagram illustrating a representative example of the creation of a group and invitation of group members in accordance with the group management framework of the present invention.

FIG. 5 is a message flow diagram illustrating a representative example of the creation of a group and invitation of group members in accordance with the group management framework of the present invention. In the embodiment of FIG. 5, SIP is the representative protocol used to form connections, although other protocols may analogously be used. Each device is equipped with SIP group application/middleware that is used for group formation and management. In this example, SIP is used for addressing and connecting to members' devices, however the actual group management and communication may use an application-level protocol on top of SIP connections. For example, while SIP or other analogous protocol for initiating sessions may be used to invite other parties to a communication session, one embodiment of the invention involves using another protocol to facilitate functions such as negotiation associated with joining or leaving a group, and/or any other group management functions.

In the example of FIG. 5, the club organizer 500 (Alice) creates 502 a new club. She identifies 503 a user for invitation to the new club, and sends an invite (e.g., SIP INVITE message) 504 to invited user-1 506 (Bob) via the SIP proxy 508. A Transmission Control Protocol (TCP) connection 510 is established, and a request success notification 512 (e.g., 200 OK) is returned to Alice 500. An acknowledgement 514 (e.g., ACK) is returned to Bob 506, and an invitation packet 516 is forwarded from Alice 500 to Bob 506. Bob 506 sends an invitation acceptance packet 518. In response, Alice 500 converts 520 Bob to a full member, sends the full club information 522 including the member list to Bob 506, and sends a new member announcement of Bob to each member (which currently includes only Bob). Bob 506 is now a member of Alice's group, and is also able to invite members to the group using the mirrored information (club information) provided by Alice.

Alice 500 then invites 526 a second user 528, Cecil, to the group. This is initiated by forming a SIP connection and TCP pipe 530, and an invitation packet 532 to Cecil. Cecil 528 sends an invitation acceptance packet 534 if membership is accepted by Cecil, and in response Alice 500 sends the full club information 536 to Cecil 528. Alice then sends a new member announcement 538, 540 of Cecil to each member of the group, which now includes both Bob 506 and Cecil 528. Open SIP connections from Alice are then terminated 542 when Alice exits the application.

It is noted that as each connection is made, the group management framework checks if the connecting party is a member of the group. If not, then only invitation messages are accepted. This is an example of white listing to restrict access to group information.

Figure 6:
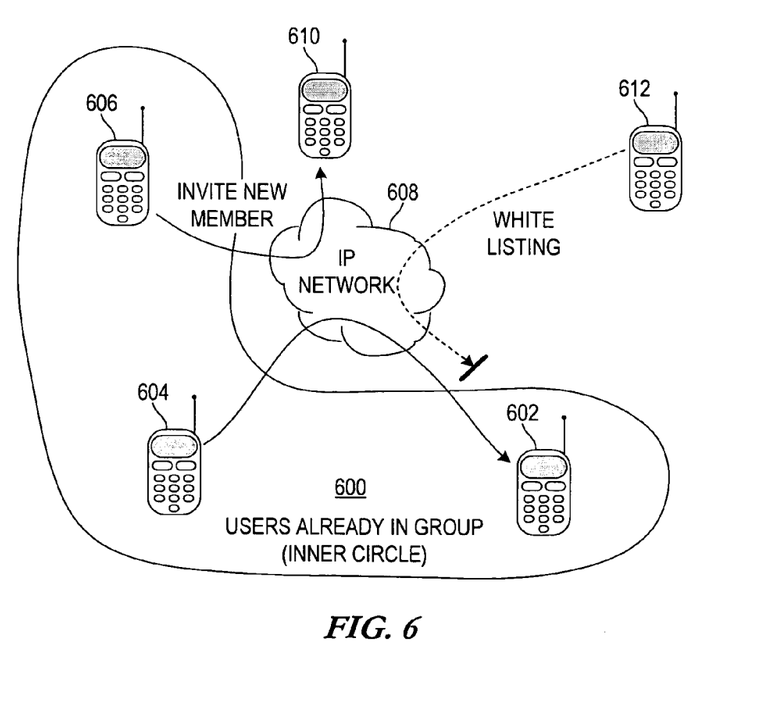
FIG. 6 illustrates an exemplary manner for providing a level of group security in the peer-to-peer framework.

FIG. 6 illustrates an example of a manner for providing a level of group security in the peer-to-peer framework. When a symmetric group management framework is in place, it can use the member list to allow or disallow incoming connections attempting to use any of the group communication features. For example, if the group has an image-sharing feature, and a person shares her image library with a certain group, the group management framework can restrict the people who are able to view the images by using the group member list. Since each member is listed on the group member list, non-members will not be able to reach the group communication features unless they are also invited to the group.

More particularly, FIG. 6 illustrates three existing members of the group 600, namely devices 602, 604 and 606. By way of the network 608, which is an Internet Protocol (IP) network in the illustrated embodiment, a new member 610 can be invited to the group 600. On the other hand, if the user of device 612 attempts to use a group communication feature (e.g., the image-sharing feature of the previous example), the user is restricted from using the feature because the user of device 612 is not associated with the member list. The group management framework of, for example, device 602 can determine whether the device 612 is associated with the member list by comparing information associated with the device 612 with the information of the member list. If the device 612 is not found on the member list, no access is allowed. The member list therefore acts as a "white list" of addresses where connections are allowed.

Figure 7:
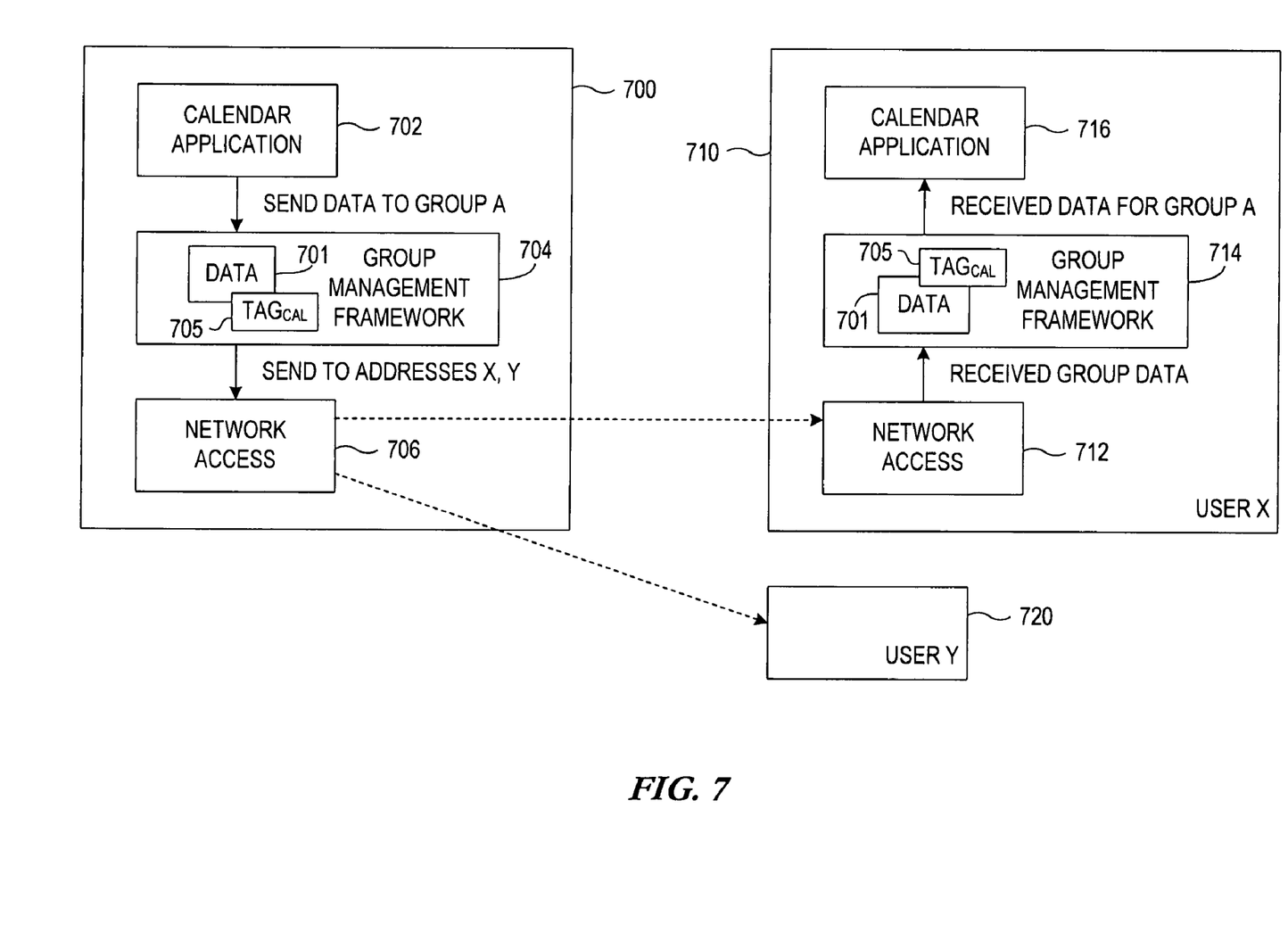
FIG. 7 illustrates an example of sending application information to members of a given group.

FIG. 7 illustrates an example of sending application information to members of a given group. Because there may be many applications that need group communication services, each application may send its data over the group communication framework in a custom manner. An exemplary application is a calendar application, as people belonging to a group may want to share calendar entries with the members of the group. This represents an example of a service using the group communication framework of the present invention.

In the example of FIG. 7, device 700 includes a calendar application 702. The user of device 700 may send calendar data 701 to group A. The group management framework 704 determines the group members for group A, and sends the information to the appropriate addresses (e.g., addresses X, Y associated with user X 710 and user Y 720) via the network access module 706. Each user device includes a network access module 712, and the received group data is provided to the respective group management framework module 714 which can then be provided to the appropriate application 716.

In this case, the calendar application 702 of the sending device 700 can access the symmetric group using the group management framework. It can directly instruct the framework 704 to send its data (e.g., a calendar entry) to the members of a given group. The calendar application 702 does not need to be concerned about the manner in which the data will actually be sent—the framework 704 handles that. The data is "tagged" in a manner to be associated with the calendar application, as depicted by the calendar tag 705 labeled TAG-$_{CAL}$. After the calendar data has been sent to members of the group, the recipient devices 710, 720 will decode the data 701 and do something useful with it. Using the tag 705 associated with the data 701, the receiving group management framework instance (e.g., group management framework instance 714) can determine which application sent the data. Using this tag 705, the receiving group management framework instance 714 notifies the local calendar application 716 that new data has been received. The calendar application 716 of the receiving devices then processes the data 701; e.g., adding the calendar entry to the local calendar.

It should be noted that a similar process may be used for other applications, and the calendar application is described for purposes of facilitating an understanding of this aspect of the invention. Other applications will be associated with respective tags, thereby allowing the group management framework of the recipient devices to determine the appropriate local application to process the data.

Figure 8:
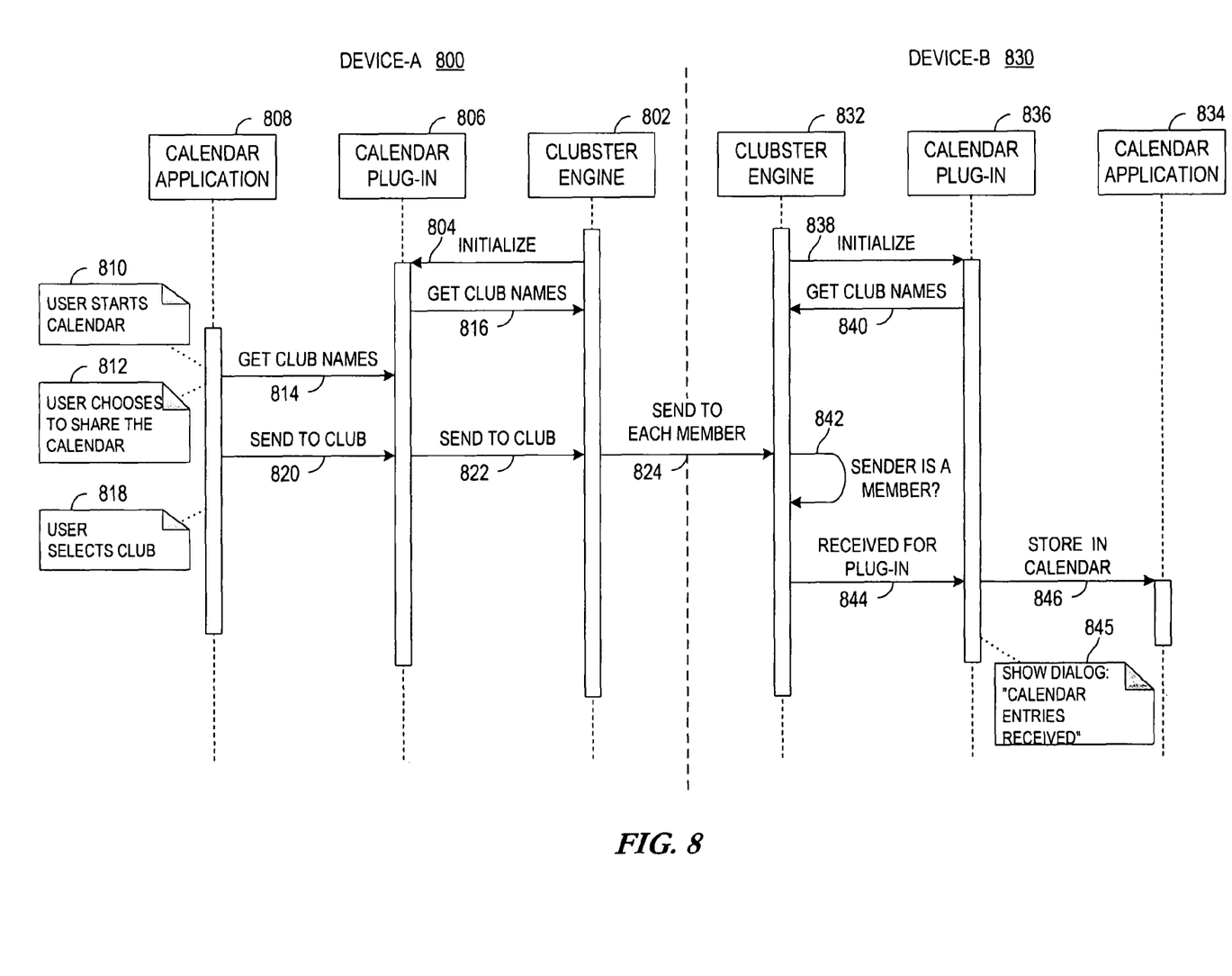
FIG. 8 is a message flow diagram illustrating a representative example of the manner in which application data may be provided through the group management framework of the present invention.

FIG. 8 is a message flow diagram illustrating a representative example of the manner in which application data may be provided through the group management framework of the present invention. In the embodiment of FIG. 8, the representative application is a calendar application, and the calendar data is sent through the group management framework using a plug-in. Thus, external applications can make use of the established clubs by using the plug-in to communicate through the group management framework, as described more fully below.

In the illustrated embodiment, the group management functionality of device-A 800, shown as the clubster engine 802, initializes 804 the calendar plug-in 806 associated with the calendar 808. The user starts 810 the calendar application 808, and chooses 812 to share the associated calendar (or some portion thereof). The calendar application 808 utilizes the services of the clubster engine 802 via the plug-in 806 to get the club names 814, 816. The user selects 818 the club, and sends the club information 820, 822 to the clubster engine 802 via the plug-in 806, where the club information is tagged with an identification of that calendar plug-in 806. The clubster engine 802 identifies the members, and sends the club information to each member 824. One such member is the member associated with device-B 830, which also includes a clubster engine 832, calendar application 834 and associated plug-in 836. The clubster engine 832 initializes 838 the calendar plug-in 836, and the plug-in 836 gets the club names 840. From the information in the inbound connection 824 and the local group database, the clubster engine 832 can determine 842 whether the sender (device-A 800) is a member of the group. If so, the tag associated with the club data is identified by the receiving instance of the framework (i.e., the clubster engine 832 of device-B 830), and directed 844 to the corresponding plug-in 836. Upon receipt, a dialog such as "calendar entries received" may be displayed 845 on device-B 830. By way of the plug-in 836, the relevant information is stored 846 in the calendar of the calendar application 834.

As described above, club/group information is mirrored to each of the group members when information is disseminated throughout the group. In prior art systems, group services rely on server-based implementations where the service provider has all group members' information in its possession. Users can join such groups as long as they agree with the service terms of the service provider or third party who administers the group services. In any case, the users have to agree with the terms. Thus, in such prior art systems, these administered services are restricted in some way, and users must agree with the service providers' terms and conditions. Further, the service provider may in fact own rights to the members' data, and may choose to stop the service at any time whereby the group information is lost. The group has little or no means of controlling the lifetime of the service, and has to rely on and trust the service provider with their information. Additionally, hosting group services via a particular device of the group, such as a mobile phone, would lead to various problems. For example, due to the nature of mobile phones, they may not be available from time to time—the phone may be out of a coverage area, may have expended its battery life, etc. In such situations, the service would be unavailable to the entire group.

These and other problems are addressed by mirroring the group information in each group members' device. Disseminating the group information and storing the information on each peer device in this fashion facilitates group evolution without constraints of service providers. Changes in the group are propagated or "mirrored" to each member directly so that each user has a local store of the group information. Because the data is stored in multiple devices, a loss of one device is not significant. This aspect of the present invention provides for fault tolerance, and even allows users to change from one device to another and receive all existing group information. And, because there is no external administration, confidential or otherwise sensitive information can be stored in the group as well.

As previously indicated, a user can start a group with himself/herself as an only member. Subsequently, the user can invite other users to join the group. The group information is stored to each group members' device, and that information is available as long as there is at least one user in the group. Users can leave the group at will, and the user information for that user is removed from the group information.

Groups formed in this manner can be used for any group communication services, including but not limited to instant messaging, chat, file transfer and other content distribution, threaded conversation, and the like. Depending on the service, information such as shared files or conversations can be viewed on each member's device without any network communication. Since the group storage is mirrored on each device, the members can access the information quickly, and therefore reading or otherwise accessing the information is very fast.

Figure 9:
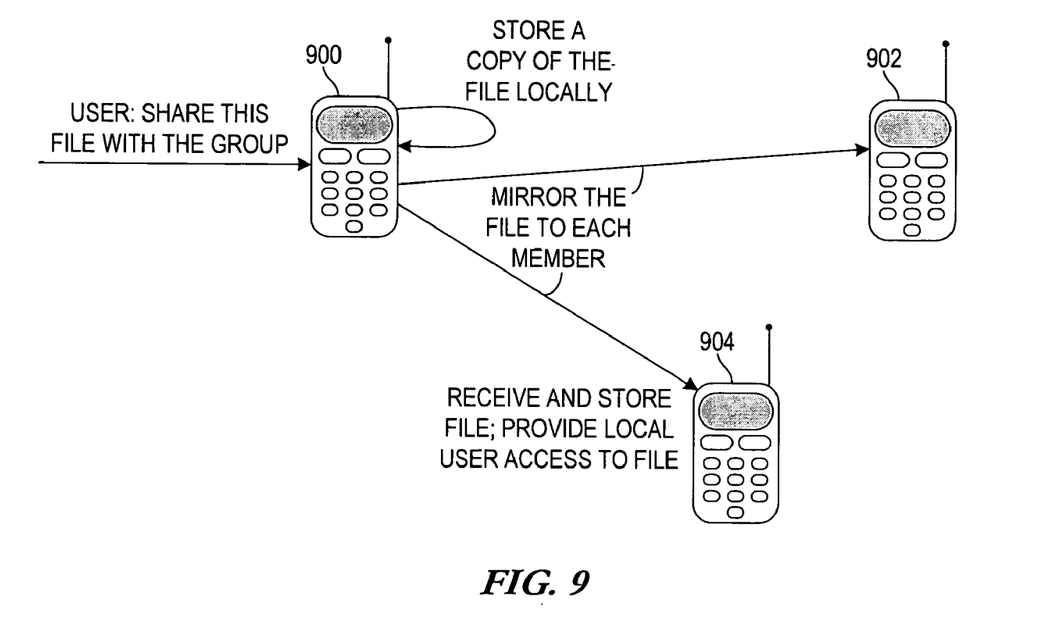
FIG. 9 illustrates an example of storing a file in accordance with the group management framework.

According to an embodiment of the invention, the group service neither requires nor utilizes centralized administration or storage. Thus, in accordance with the invention, all information that is owned by the group is distributed and synchronized to each member device. Storing information in a virtual shared storage space makes it available to group members by actually mirroring it to each member's device. An example of storing a file in accordance with the group management framework is shown in FIG. 9. The user creates or otherwise obtains content, a file(s), or other information to be shared with the group, where this information is a file in the illustrated embodiment. A copy of the file is locally stored at the user's device 900. The file is then transmitted or "mirrored" to each member of the group, as depicted by the file transfer to devices 902, 904. The recipient group devices 902, 904 receive and locally store the file, and provide the local user access to the file.

Using non-administrated group services is particularly beneficial where group members want to be independent from service providers. There is no need for extra servers for group formation purposes, and the existence of the group is not limited to external constraints. The mirroring of group data ensures that the data exists as long as there is at least one user in the group. In situations where a large number of members are in the group, synchronization issues of information among members may be alleviated by, for example, allowing the originating member to edit data in the group storage or remove data from the group storage. The originating member may be the originating member of the group, and/or the originating member of the particular information being disseminated.

Figure 10:
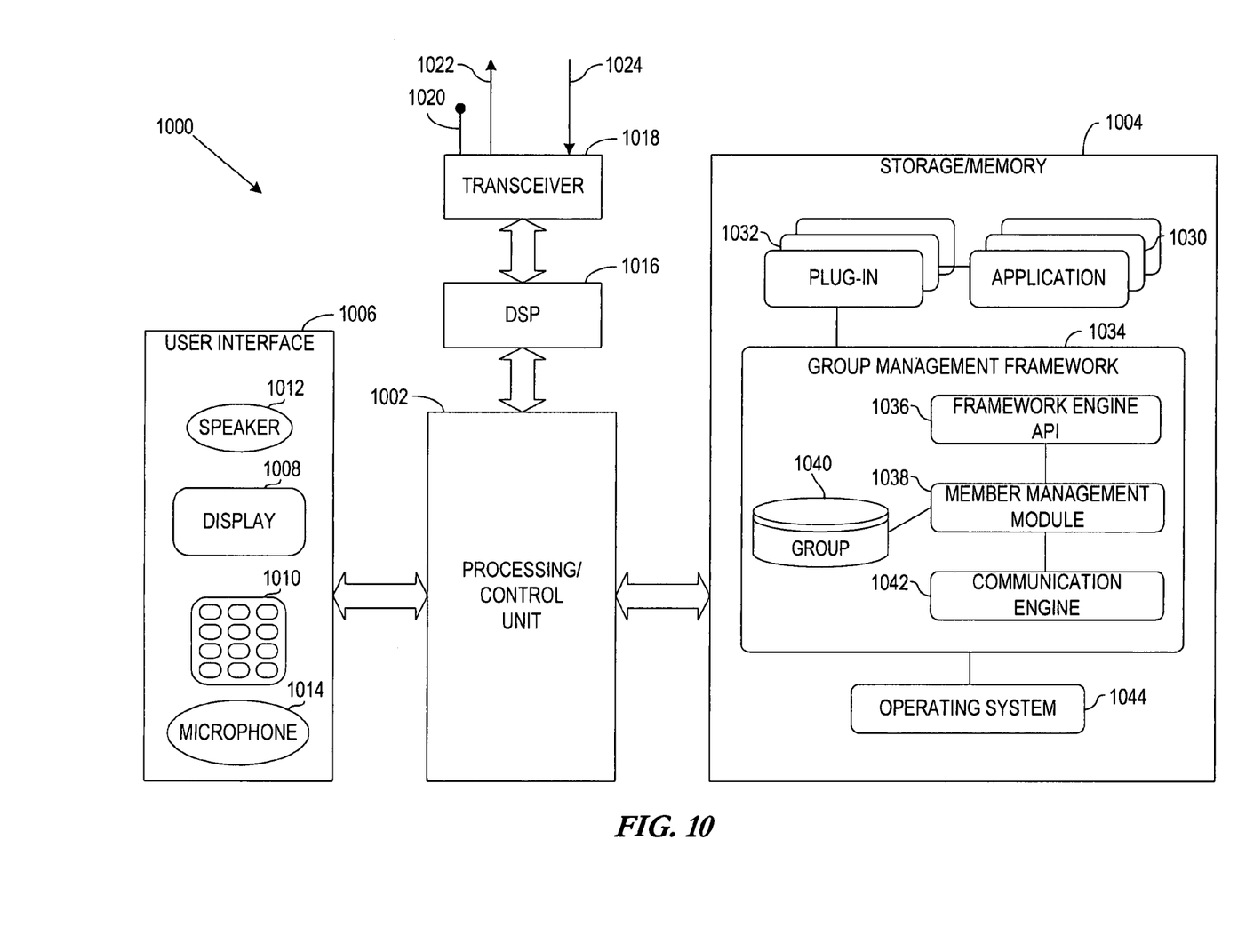
FIG. 10 illustrates a representative example of a mobile device in which the present invention may be implemented.

Hardware, firmware, software or a combination thereof may be used to perform the functions and operations in accordance with the invention. The mobile devices in accordance with the invention include communication devices such as, for example, mobile phones, PDAs, and other wireless communicators, as well as landline computing systems and communicators. A representative example of a mobile device in which the present invention may be implemented is illustrated in FIG. 10. The mobile device 1000 utilizes computing systems to control and manage the conventional device activity as well as the functionality provided by the present invention. The representative mobile device 1000 includes a computing system capable of carrying out operations in accordance with the invention. For example, the representative mobile device 1000 includes a processing/control unit 1002, such as a microprocessor, reduced instruction set computer (RISC), or other central processing module. The processing unit 1002 need not be a single device, and may include one or more processors. For example, the processing unit may include a master processor and associated slave processors coupled to communicate with the master processor.

The processing unit 1002 controls the basic functions of the mobile device 1000 as dictated by programs available in the program storage/memory 1004. The storage/memory 1004 may include an operating system and various program and data modules associated with the present invention. In one embodiment of the invention, the programs are stored in non-volatile electrically-erasable, programmable read-only memory (EEPROM), flash ROM, etc., so that the programs are not lost upon power down of the mobile device. The storage 1004 may also include one or more of other types of read-only memory (ROM) and programmable and/or erasable ROM, random access memory (RAM), subscriber interface module (SIM), wireless interface module (WIM), smart card, or other fixed or removable memory device. The relevant software for carrying out mobile device operations in accordance with the present invention may also be transmitted to the mobile device 1000 via data signals, such as being downloaded electronically via one or more networks, such as the Internet and an intermediate wireless network(s).

For performing other standard mobile device functions, the processor 1002 is also coupled to user-interface (UI) 1006 associated with the mobile device 1000. The UI 1006 may include, for example, a display 1008 such as a liquid crystal display, a keypad 1010, speaker 1012, and microphone 1014. These and other UI components are coupled to the processor 1002 as is known in the art. The keypad 1010 may include alpha-numeric keys for performing a variety of functions, including dialing numbers, navigating through graphical UI screens, etc. Other UI mechanisms may be employed, such as voice commands, switches, touch pad/screen, graphical user interface using a pointing device, trackball, joystick, or any other user interface mechanism.

The wireless device 1000 may also include conventional circuitry for performing wireless transmissions over the mobile network. The DSP 1016 may be employed to perform a variety of functions, including analog-to-digital (A/D) conversion, digital-to-analog (D/A) conversion, speech coding/decoding, encryption/decryption, error detection and correction, bit stream translation, filtering, etc. The transceiver 1018, generally coupled to an antenna 1020, transmits the outgoing radio signals 1022 and receives the incoming radio signals 1024 associated with the mobile device 1000.

In the illustrated embodiment, the storage/memory 1004 stores the various client programs or user agents involved in facilitating the group management framework functions in accordance with the present invention. For example, the storage 1004 may include various program modules, such as an application(s) 1030 and associated application plug-in(s) 1032. The storage/memory 1004 also includes the group management framework which includes, for example, the framework engine API 1036, member management module 1038 and associated database 1040 of group data, and a communication engine 1042. Standard data or programs may also be included in the storage/memory 1004, such as the operating system 1044.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

What is claimed is:

1. A method, comprising:
    initiating, at an initiating member of a group having a plurality of members, at least one group management function that facilitates restricting membership to the group, wherein the at least one group management function comprises the configuration of a group access list;
    causing, at least in part, transmission via peer-to-peer wireless telecommunication group management messages associated with the group management function from the initiating member to one or more other members of the group, wherein, the group management messages comprises membership data with the group access list to the one or more other members of the group;
    facilitating management of group wireless telecommunications among the members of the group based on the group management message; and
    maintaining a local copy of the group access list of the initiating member by updating a local change to the local copy of the initiating member and transmitting only the updated local change to all other members in the group, and by receiving a change of a local copy of the group access list of one of the other members and synchronizing the received change only to the local copy of the initiating member.

2. The method of claim 1, further comprising
    creating or receiving at the imitating member one or more files;
    configure a virtual shared storage space at the initiating member; and
    storing the one or more files into the virtual shared storage space.

3. A method of claim 2, further comprising at least one of:
    synchronizing updates of one or more files received from the other members of the group into the virtual shared storage space, and
    editing one or more files in the virtual shared storage space thereby synchronizing the updates of the files to the other members of the group.

4. The method of claim 1, wherein each of the group management messages to a prospective member of the group comprises an invitation for the prospective member of the group.

5. The method of claim 1, further comprising:
    transmitting an invitation from an inviting member of the group to a prospective member;
    upon receiving acceptance of the invitation from the prospective member, updating a local copy of the group access list at the inviting member to include the prospective member as a new member of the group; and
    transmitting group data, including the updated local copy of the group access list, via the peer-to-peer communication, from the inviting member to the new member.

6. The method of claim 5, further comprising transmitting a new member announcement, via the peer-to-peer communication, from the inviting member to each of the other members of the group.

7. The method of claim 1, further comprising:
    receiving at a receiving member of the group a request from a requesting communication device for access to the at least one group management function available to the group;
    comparing identification information of the requesting communication device with a local copy of the group access list of the receiving member; and
    disallowing access by the requesting communication device to the requested group management function if the identification information does not correspond to any entry of the local copy of the group access list.

8. The method of claim 7, further comprising allowing access by the requesting communication device to the requested group management function if the identification information matches an entry of the local copy of the group access list.

9. The method of claim 8, further comprising communicating the identification information to the members of the group based on the identification information matching the entry of the local copy of the group access list.

10. The method of claim 1, comprising: causing, at least in part, transmission of application data of an application from a member of the group via peer-to-peer wireless telecommunication to each of the other members of the group.

11. The method of claim 10, further comprising:
prior to the transmission of the application data, tagging the application data with an identification of the application for locally identifying at the each other member a local application to utilize the application data based on the identification of the application.

12. The method of claim 10, further comprising:
prior to the transmission of the application data, tagging the application data with an identification of an application plug-in associated with the application for locally identifying at the each other member a local application plug-in associated with a local application to utilize the application data based on the identification of the application plug-in.

13. The method of claim 12, wherein the application plug-in comprises at least one of a calendar plug-in and a discussion forum plug-in.

14. A computer-readable storage medium carrying one or more sequences of one or more instructions which, when executed by one or more processors, cause an apparatus to at least perform the following steps:
initiating, at an initiating member of a group having a plurality of members, at least one group management function that facilitates restricting membership to the group, wherein the at least one group management function comprises the configuration of a group access list;
transmitting via peer-to-peer wireless telecommunication group management messages associated with the group management function from the initiating member to one or more other members of the group, wherein, the group management messages comprises membership data with the group access list to the one or more other members of the group;
facilitating management of group wireless telecommunications among the members of the group based on the group management message; and
maintaining a local copy of the group access list of the initiating member by updating a local change to the local copy of the initiating member and transmitting only the updated local change to all other members in the group, and by receiving a change of a local copy of the group access list of one of the other members and synchronizing the received change only to the local copy of the initiating member.

15. The computer-readable storage medium of claim 14, wherein the apparatus is caused to further perform:
creating or receiving at the initiating member one or more files;
configure a virtual shared storage space at the initiating member;
storing the one or more files into the virtual shared storage space; and at least one of:
synchronizing updates of one or more files received from the other members of the group into the virtual shared storage space, and
editing one or more files in the virtual shared storage space thereby synchronizing the updates of the files to the other members of the group.

16. The computer-readable storage medium of claim 14, wherein the apparatus is caused to further perform: transmitting application data of an application from the initiating member of the group via peer-to-peer wireless telecommunication to each of the other members of the group.

17. The computer-readable storage medium of claim 16, wherein the apparatus is caused to further perform: prior to the transmission of the application data, tagging the application data with an identification of an application plug-in associated with the application, for locally identifying at the each other member a local application plug-in associated with a local application to utilize the application data based on the identification of the application plug-in, wherein the application plug-in comprises at least one of a calendar plug-in and a discussion forum plug-in.

18. An apparatus comprising:
at least one processor; and
at least one memory including computer program code,
the at least one memory and the computer program code configured to, with the at least one processor, cause the apparatus to perform at least the following,
initiate, at an initiating member of a group having a plurality of members, at least one group management function that facilitates restricting membership to the group, wherein the at least one group management function comprises the configuration of a group access list;
transmit via peer-to-peer wireless telecommunication group management messages associated with the group management function from the initiating member to one or more other members of the group, wherein, the group management messages comprises membership data with the group access list to the one or more other members of the group;
facilitate management of group wireless telecommunications among the members of the group based on the group management message; and
maintain a local copy of the group access list of the initiating member by updating a local change to the local copy of the initiating member and transmitting only the updated local change to all other members in the group, and by receiving a change of a local copy of the group access list of one of the other members and synchronizing the received change only to the local copy of the initiating member.

19. The apparatus of claim 18, wherein each of the group management messages to a prospective member of the group comprises an invitation for the prospective member of the group.

20. The apparatus of claim 18, wherein the apparatus is further caused to:
transmit an invitation to a prospective member;
upon receiving acceptance of the invitation from the prospective member, update the local copy of the group access list to include the prospective member as a new member of the group; and
transmit group data, including the updated local copy of the group access list, via the peer-to-peer communication, to the new member.

21. The apparatus of claim 20, wherein the apparatus is further caused to: transmit a new member announcement to each of the other members of the group.

22. The apparatus of claim 18, wherein the apparatus is further caused to:
receive a request from a requesting communication device for access to the at least one group management function available to the group;
compare identification information of the requesting communication device with the local copy of the group access list; and
disallow access to the requested group management function if the identification information does not correspond to any entry of the local copy of the group access list.

23. The apparatus of claim 22, wherein the apparatus is further caused to: allow access to the requested group management function if the identification information matches an entry of the local copy of the group access list.

24. A system, comprising:
a plurality of apparatuses, each of which comprising:
at least one processor; and
at least one memory including computer program code,
the at least one memory and the computer program code configured to, with the at least one processor, cause the apparatus to perform at least the following,
initiate, at an initiating member of a group having a plurality of members, at least one group management function that facilitates restricting membership to the group, wherein the at least one group management function comprises the configuration of a group access list;
transmit via peer-to-peer wireless telecommunication group management messages associated with the group management function from the initiating member to one or more other members of the group, wherein, the group management messages comprises membership data with the group access list to the one or more other members of the group;
facilitate management of group wireless telecommunications among the members of the group based on the group management message; and
maintain a local copy of the group access list of the initiating member by updating a local change to the local copy of the initiating member and transmitting only the updated local change to all other members in the group, and by receiving a change of a local copy of the group access list of one of the other members and synchronizing the received change only to the local copy of the initiating member.

25. The system of claim 24, wherein each of the group management messages to a prospective member of the group comprises an invitation for the prospective member of the group.

26. The system of claim 24, wherein the apparatus is further caused to:
transmit an invitation to a prospective member;
upon receiving acceptance of the invitation from the prospective member, update the local copy of the group access list to include the prospective member as a new member of the group; and
transmit group data, including the updated local copy of the group access list, via the peer-to-peer communication, to the new member.

27. The system of claim 26, wherein the apparatus is further caused to: transmit a new member announcement to each of the other members of the group.

28. The system of claim 24, wherein the apparatus is further caused to:
receive a request from a requesting communication device for access to the at least one group management function available to the group;
compare identification information of the requesting communication device with the local copy of the group access list; and
disallow access to the requested group management function if the identification information does not correspond to any entry of the local copy of the group access list.

29. The system of claim 28, wherein the apparatus is further caused to: transmit a new member announcement to each of the other members of the group.

* * * * *